(12) United States Patent
Nishiyama et al.

(10) Patent No.: US 8,648,898 B2
(45) Date of Patent: *Feb. 11, 2014

(54) STEREOSCOPIC LIQUID CRYSTAL SHUTTER GLASSES AND STEREOSCOPIC IMAGE DISPLAY SYSTEM

(75) Inventors: Kazuhiro Nishiyama, Ishikawa-ken (JP); Mitsutaka Okita, Ishikawa-ken (JP); Shigesumi Araki, Ishikawa-ken (JP); Toshiyuki Higano, Ishikawa-ken (JP)

(73) Assignee: Japan Display Inc., Fukaya-shi (JP)

( * ) Notice: Subject to any disclaimer, the term of this patent is extended or adjusted under 35 U.S.C. 154(b) by 336 days.

This patent is subject to a terminal disclaimer.

(21) Appl. No.: 13/073,319

(22) Filed: Mar. 28, 2011

(65) Prior Publication Data
US 2011/0242101 A1    Oct. 6, 2011

(30) Foreign Application Priority Data

Mar. 30, 2010    (JP) ................................. 2010-078028

(51) Int. Cl.
*H04N 13/04*    (2006.01)
(52) U.S. Cl.
USPC ......................................................... 348/56
(58) Field of Classification Search
None
See application file for complete search history.

(56) References Cited

U.S. PATENT DOCUMENTS

| | | | | |
|---|---|---|---|---|
| 4,884,876 A | * | 12/1989 | Lipton et al. | 349/33 |
| 6,266,106 B1 | * | 7/2001 | Murata et al. | 349/15 |
| 6,278,501 B1 | * | 8/2001 | Lin | 349/13 |
| 2001/0038491 A1 | * | 11/2001 | Fergason | 359/466 |
| 2004/0036821 A1 | * | 2/2004 | Paukshto et al. | 349/74 |
| 2005/0206832 A1 | * | 9/2005 | Tahara et al. | 349/182 |
| 2008/0129899 A1 | * | 6/2008 | Sharp | 349/13 |
| 2011/0032343 A1 | * | 2/2011 | Ogawa et al. | 348/54 |

FOREIGN PATENT DOCUMENTS

JP    8-327961    12/1996

OTHER PUBLICATIONS

U.S. Appl. No. 13/073,160, filed Mar. 28, 2011, Nishiyama, et al.

* cited by examiner

*Primary Examiner* — Joseph Ustaris
*Assistant Examiner* — Zhubing Ren
(74) *Attorney, Agent, or Firm* — Oblon, Spivak, McClelland, Maier & Neustadt, L.L.P.

(57) ABSTRACT

According to one embodiment, stereoscopic liquid crystal shutter glasses include a left-eye liquid crystal shutter and a right-eye liquid crystal shutter. Each of the left-eye liquid crystal shutter and the right-eye liquid crystal shutter has a response time not more than 5 milliseconds. Each of the left-eye liquid crystal shutter and the right-eye liquid crystal shutter has a contrast ratio not less than 350:1. The contrast ratio is a value at an angle of sight of 30 degrees in left direction and in right direction.

9 Claims, 7 Drawing Sheets

| No. | | | SP01 | SP02 | SP03 | SP04 | SP05 | SP06 | SP07 | SP08 | SP09 | SP10 |
|---|---|---|---|---|---|---|---|---|---|---|---|---|
| θPOL1 (degree) | | | 0° | 0° | 0° | 0° | 0° | 0° | 0° | 0° | 0° | 0° |
| F10 | F13 | type | — | — | — | — | — | type-B | — | — | — | — |
| | | θF13 (degree) | — | — | — | — | — | 90 | — | — | — | — |
| | | ReF13 (nm) | — | — | — | — | — | 137 | — | — | — | — |
| | | RtF13 (nm) | — | — | — | — | — | 0 | — | — | — | — |
| | F12 | type | type-B | type-B | type-C | type-C | type-C | type-C | type-A | type-B | type-B | type-B |
| | | θF12 (degree) | 90 | 90 | 45 | 45 | 45 | 45 | 38 | 90 | 0 | 45 |
| | | ReF12 (nm) | 38 | 38 | 0 | 0 | 0 | 0 | 139 | 80 | 275 | 42 |
| | | RtF12 (nm) | 173 | 173 | 237 | 530 | 270 | 266 | — | 105 | 0 | 0.153 |
| | F11 | type | type-D | type-D | type-A | type-A | type-A | Posi-A | type-C | type-E | type-E | type-E |
| | | θF11 (degree) | 45 | 45 | 135 | 135 | 135 | 135 | 0 | 45 | 45 | 45 |
| | | RF11 (nm) | 30 | 30 | 30 | 30 | 11 | 11 | 236 | 42 | 42 | 42 |
| LC | | Δn | 0.1616 | 0.1616 | 0.1616 | 0.1616 | 0.1616 | 0.1616 | 0.1616 | 0.153 | 0.153 | 0.153 |
| | | Δε | 13 | 3 | 13 | 13 | 13 | 13 | 4 | 4 | 4 | 4 |
| | | θLC | 45 | 45 | 45 | 45 | 45 | 45 | 80 | 45 | 45 | 45 |
| F20 | F21 | type | type-D | type-D | type-C | — | type-A | type-A | type-C | type-E | type-E | type-E |
| | | θF21 (degree) | 45 | 45 | 135 | — | 135 | 135 | 0 | 45 | 45 | 45 |
| | | ReF21 (nm) | 30 | 30 | 30 | — | 11 | 11 | 236 | 42 | 42 | 42 |
| | F22 | type | type-B | type-B | type-C | — | type-C | type-C | type-A | type-B | type-B | type-B |
| | | θF22 (degree) | 90 | 90 | 45 | — | 45 | 45 | 142 | 0 | 0 | 45 |
| | | ReF22 (nm) | 38 | 38 | 0 | — | 0 | 0 | 139 | 80 | 30 | 30 |
| | | RtF22 (nm) | 173 | 173 | 237 | — | 270 | 266 | — | 105 | 200 | 200 |
| | F23 | type | — | — | — | — | — | type-B | — | — | — | — |
| | | θF23 (degree) | — | — | — | — | — | 90 | — | — | — | — |
| | | ReF23 (nm) | — | — | — | — | — | 137 | — | — | — | — |
| | | ReF23 (nm) | — | — | — | — | — | 0 | — | — | — | — |
| θPOL2 (degree) | | | 90 | 90 | 90 | 90 | 90 | 90 | 90 | 90 | 90 | 90 |

# STEREOSCOPIC LIQUID CRYSTAL SHUTTER GLASSES AND STEREOSCOPIC IMAGE DISPLAY SYSTEM

CROSS-REFERENCE TO RELATED APPLICATIONS

This application is based upon and claims the benefit of priority from the prior Japanese Patent Application No. 2010-78028, filed on Mar. 30, 2010; the entire contents of which are incorporated herein by reference.

FIELD

Embodiments described herein relate generally to stereoscopic liquid crystal glasses and a stereoscopic image display system.

BACKGROUND

Liquid crystal, which has been widely applied in display devices, has a function whereby a light transmitting property can be controlled by electric signals. Making use of this function, liquid crystal has been applied in various types of shutters, including the shutters in glasses with controllable light-transmitting and light-blocking effect.

The practical application of stereoscopic systems is advancing in fields such as leisure, education, broadcasting, and medicine. In stereoscopic systems, liquid crystal is used in fast-response shutters which show left-eye and right-eye images corresponding to the parallax between the left and right eyes on a time-divided basis. For instance, JP-A 08-327961 (1996) (Kokai) describes a stereoscopic image display device that uses shutter glasses with liquid-crystal cells having a right-eye region and a left-eye region.

When stereoscopic images of a movie or the like are viewed using a stereoscopic image display system that uses liquid crystal shutter glasses, the viewer can, in some cases, experience fatigue and discomfort. This effect is understood to prevent comfortable enjoyment of stereoscopic images.

DETAILED DESCRIPTION

In general, according to one embodiment, stereoscopic liquid crystal shutter glasses include a left-eye liquid crystal shutter and a right-eye liquid crystal shutter. Each of the left-eye liquid crystal shutter and the right-eye liquid crystal shutter has a response time not more than 5 milliseconds. Each of the left-eye liquid crystal shutter and the right-eye liquid crystal shutter has a contrast ratio not less than 350:1. The contrast ratio is a value at an angle of sight of 30 degrees in left direction and in right direction.

Various embodiments will be described hereinafter with reference to the accompanying drawings.

Note that the drawings are schematic or simplified illustrations and that relationships between thickness and widths of parts and proportions in size between parts may differ from actual parts. Also, even where identical parts are depicted, mutual dimensions and proportions may be illustrated differently depending on the drawing.

Note that in the drawings and specification of the application, the same numerals are applied to constituents that have already appeared in the drawings and have been described, and repetitious detailed descriptions of such constituents are omitted.

First Embodiment

Figure 1:
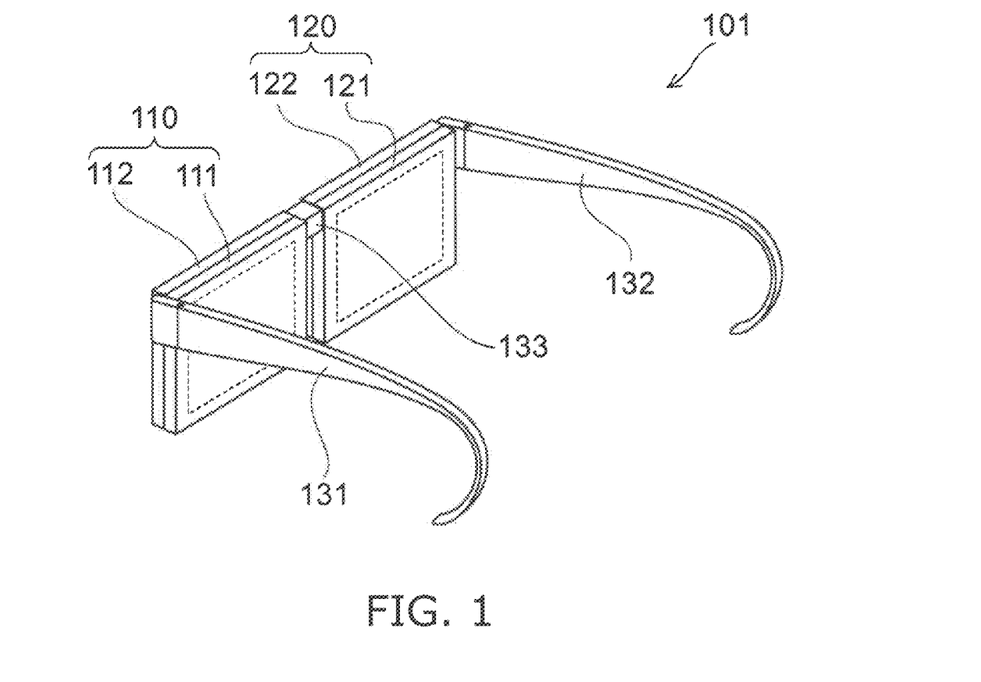
FIG. 1 is a schematic perspective view illustrating the configuration of stereoscopic liquid crystal shutter glasses according to a first embodiment.

FIG. 1 is a schematic perspective view illustrating the configuration of stereoscopic liquid crystal shutter glasses according to a first embodiment.

Figure 2:
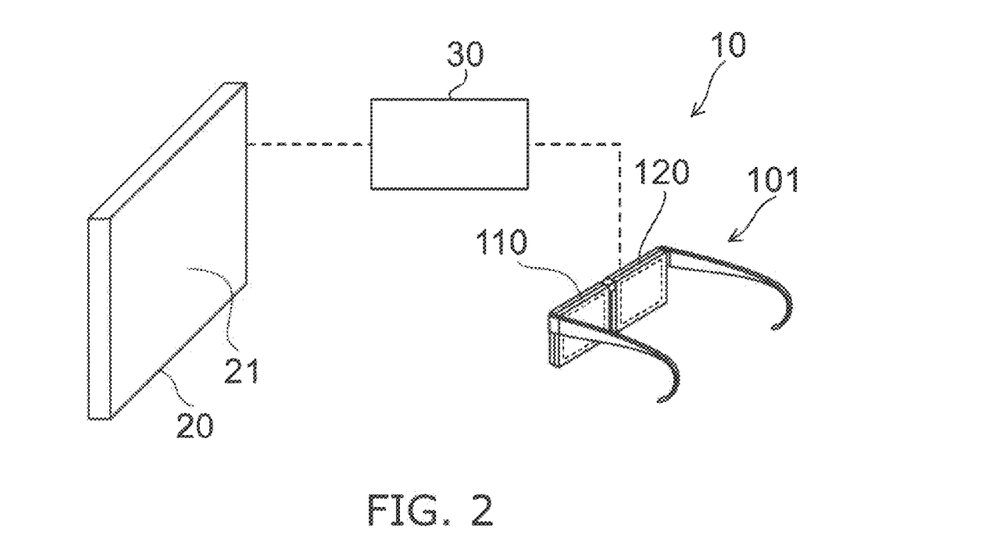
FIG. 2 is a schematic perspective view illustrating the configuration of a stereoscopic image display system in which the stereoscopic liquid crystal shutter glasses according to the first embodiment are used.

FIG. 2 is a schematic perspective view illustrating the configuration of a stereoscopic image display system in which the stereoscopic liquid crystal shutter glasses according to the first embodiment are used.

Firstly, with reference to FIG. 2, a description is given of the concept of the stereoscopic image display system in which the stereoscopic liquid crystal shutter glasses according to the embodiment are used.

As illustrated in FIG. 2, a stereoscopic image display system 10 includes a display device 20 and stereoscopic liquid crystal shutter glasses 101. The display device 20 has a display screen 21. The images a viewer views are displayed on the display screen 21. The viewer views images displayed on the display screen 21 through stereoscopic liquid crystal shutter glasses 101.

The stereoscopic image display system 10 has a three-dimensional image display mode. In the three-dimensional image display mode, left-eye images and right-eye images corresponding to the parallax of the viewer are displayed alternately. The stereoscopic liquid crystal shutter glasses 101 perform a switching operation to change between the left-eye images and right-eye images. Accordingly, the left-eye image and right-eye image are presented alternately on a time division basis to the left and right eyes of the viewer. The stereoscopic image display system 10 may have an operation mode in which the viewer views the image displayed on the display screen 21 as a two-dimensional image. The three-dimensional image display mode is described below.

In the display device 20, an active matrix liquid crystal display may, for instance, be used. In the display device 20, images with a field frequency of 120 Hz or the like are, for instance, displayed through digital signal processing using a field memory.

As illustrated in FIG. 1, the stereoscopic liquid crystal shutter glasses 101 include a left-eye liquid crystal shutter 110 and a right-eye liquid crystal shutter 120. The design is such that the left-eye liquid crystal shutter 110 opposes the left eye of the viewer and the right-eye liquid crystal shutter 120 opposes the right eye of the viewer.

The left-eye image and the right-eye image are displayed alternately on the display screen 21, switching with each field. For the period that the left-eye image is displayed, the left-eye liquid crystal shutter 110 is set to a transparent state and the right-eye liquid crystal shutter 120 is set to a light-blocking state. Then, for the period that the right-eye image is displayed, the right-eye liquid crystal shutter 120 is in a transparent state and the left-eye liquid crystal shutter 110 is in a light-blocking state.

The stereoscopic image display system 10 may further include a control unit 30. Operation of the above-described stereoscopic liquid crystal shutter glasses 101 may, for instance, be controlled by the control unit 30. Note, however, that the functions of the control unit 30 may be included in either the display device 20 or the stereoscopic liquid crystal shutter glasses 101. Transfer of signals between the control unit 30 and the display device 20, transfer of signals between the control unit 30 and the stereoscopic liquid crystal shutter glasses 101, and transfer of signals between the display device 20 and the stereoscopic liquid crystal shutter glasses 101 are performed through wires or wirelessly.

As illustrated in FIG. 1, the stereoscopic liquid crystal shutter glasses 101 according to the embodiment includes the left-eye liquid crystal shutter 110. In the example, the stereoscopic liquid crystal shutter glasses 101 further include the right-eye liquid crystal shutter 120 and a holding part 130. The holding part 130 holds the left-eye liquid crystal shutter 110 and the right-eye liquid crystal shutter 120.

In the example, the left-eye liquid crystal shutter 110 includes a left-side first substrate unit 111, a left-side second substrate unit 112, and a left-side liquid crystal layer (not illustrated) provided between the left-side first substrate unit 111 and the left-side second substrate unit 112. The left-side first substrate unit 111 and the left-side second substrate unit 112 include electrodes and a polarizing film (polarizing plate, polarizing device) or the like. The left-side first substrate unit 111 and the left-side second substrate unit 112 may further include various optical compensation devices.

The right-eye liquid crystal shutter 120 includes a right-side first substrate unit 121, a right-side second substrate unit 122, and a right-side liquid crystal layer (not illustrated) provided between the right-side first substrate unit 121 and the right-side second substrate unit 122. The right-side first substrate unit 121 and the right-side second substrate unit 122 include electrodes and a polarizing film (polarizing plate, polarizing device) or the like. The right-side first substrate unit 121 and the right-side second substrate unit 122 may further include various optical compensation devices.

The holding part 130 includes, for instance, a left-side temple arm 131 and a right-side temple arm 132. These temple arms make it easier for the viewer to wear the stereoscopic liquid crystal shutter glasses 101. The left-side temple arm 131 and the right-side temple arm 132 may be provided as necessary. Moreover, when the left-eye liquid crystal shutter 110 and the right-eye liquid crystal shutter 120 are separate bodies, a joint part 133 that joins a portion of the left-eye liquid crystal shutter 110 to a portion of the right-eye liquid crystal shutter 120 is provided in the holding part 130.

In the stereoscopic liquid crystal shutter glasses 101 according to the embodiment with such a construction, a response time of each of the left-eye liquid crystal shutter 110 and the right-eye liquid crystal shutter 120 is set to be not more than 5 milliseconds (ms). Further, when the angle of sight in the left and right directions of each of the left-eye liquid crystal shutter 110 and the right-eye liquid crystal shutter 120 is 30 degrees, the contrast ratio is set to be not less than 350:1.

Accordingly, it is possible to provide stereoscopic liquid crystal shutter glasses that eliminate visible 3D cross-talk, which is described later, suppresses fatigue and discomfort, thereby enabling comfortable enjoyment of stereoscopic images.

The stereoscopic liquid crystal shutter glasses 101 according to the embodiment, which have such characteristics, are constructed based on the following research.

The inventors investigated causes of fatigue and discomfort that can occur when viewing stereoscopic images with a stereoscopic image display system. The results showed that fatigue and discomfort resulted from two causes. The results of this investigation are described below.

As a first cause, the user was found to experience fatigue and discomfort if the response speed of the liquid crystal shutters in the stereoscopic liquid crystal shutter glasses was lower than a certain value.

The following description relates to the response time corresponding to response speed of the liquid crystal shutter.

Figure 3A:
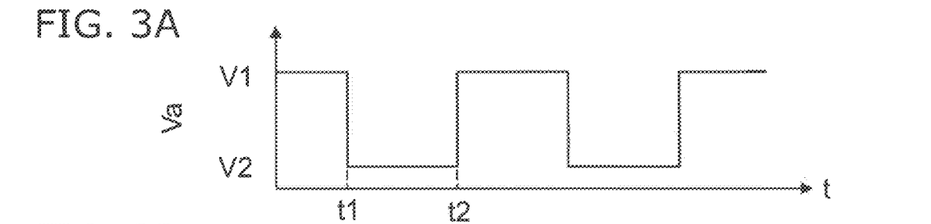
FIGS. 3A and 3B are schematic views illustrating the response time of the stereoscopic liquid crystal shutter glasses.
Figure 3B:
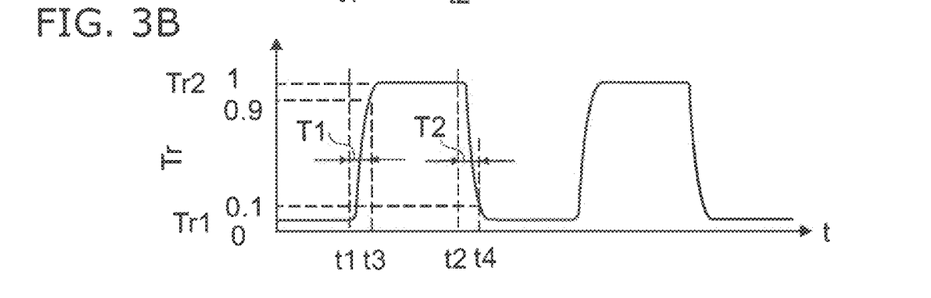

FIG. 3A and FIG. 3B are schematic views illustrating the response time of the stereoscopic liquid crystal shutter glasses.

Specifically, FIG. 3A illustrates an applied voltage Va that is applied to one of the liquid crystal shutters and FIG. 3B illustrates a change in transmission Tr of the liquid crystal shutter. In the graphs, time t is plotted along the horizontal axes.

As illustrated in FIG. 3A, at a time t1, the applied voltage Va changes from a first voltage V1 to a second voltage V2. Then, at a time t2, the applied voltage Va changes from the second voltage V2 to the first voltage V1. The time t1 is, for instance, synchronous with the timing of the switch from the right-eye image to the left-eye image. The time t2 is, for instance, synchronous with the timing of the switch from the left-eye image to the right-eye image. Also, one of the first voltage V1 and the second voltage V2 may be zero (0) volts. In the example, the second voltage V2 may be zero (0) volts.

At the time t1, the transmission Tr shifts from a first transmission Tr1 to a second transmission Tr2. At the time t2, the transmission Tr shifts from the second transmission Tr2 to the first transmission Tr1. Let a difference between the first transmission Tr1 and the second transmission Tr2 be one (1). Here, a time, after the time t1, at which the transmission Tr reaches 0.9 is denoted as a third time t3. Moreover, a time, after the time t2, at which the transmission Tr reaches 0.1 is denoted as a fourth time t4.

A first response time T1 is the period from the time t1 to the time t3. A second response time T2 is the period from the time t2 to the time t4. The first response time T1 is, for instance, response time when on. The second response time T2 is, for instance, the response time when off.

Here, a state where the first voltage V1 is applied, for instance, is an off state. A state where the second voltage V2 is applied is an on state. The first transmission Tr1 corresponds to the transmission when off and the second transmission Tr2 corresponds to the transmission when on.

FIG. 3A and FIG. 3B illustrate an example of one liquid crystal shutter operation. FIG. 3A and FIG. 3B correspond, for instance, to an operation of the left-eye liquid crystal shutter 110. When the first voltage V1 is applied to the left-eye liquid crystal shutter 110, the second voltage V2 is applied to the right-eye liquid crystal shutter 120. When the second voltage V2 is applied to the left-eye liquid crystal shutter 110, the first voltage V1 is applied to the right-eye liquid crystal shutter 120. Thus, the left-eye liquid crystal shutter 110 and the right-eye liquid crystal shutter 120 are alternately switched between the on state and the off state.

From the results of the inventors' experiments, it was found that fatigue and discomfort could be suppressed when the first response time T1 and the second response time T2 were not more than 5 ms. In other words, when the response time is longer than 5 ms—of the order of 10 ms, for example—the user is more likely to experience discomfort and fatigue. It is supposed that the reason for these effects where that, even if the switch in the applied voltage Va is simultaneous with the switch between the right-eye image and the left-eye image, it takes time for the transmission Tr to change and, consequently, the time over which the left-eye image and the right-eye image are presented to both the left and right eyes is long. Since the left-eye image and the right-eye image are provided with a disparity corresponding to the parallax, the viewer perceives a disparity in the image if both images are presented simultaneously. It is supposed that fatigue and discomfort occur as the visual sense of the viewer attempts to compensate for the disparity.

According to the experiments by the inventors, it was found that the first response time T1 and the second response time T2 should each be not more than 5 ms to effectively suppress fatigue and discomfort. In other words, when the first response time T1 and the second response time T2 are each not more than 5 ms, fatigue and discomfort can be suppressed to a level which does not present a practical problem. It is supposed that when the two images having the right-eye image and left-eye image disparity are both shown for a short time period of not more than approximately 5 ms, the viewer is effectively unable to perceive both images.

Therefore, in the stereoscopic liquid crystal shutter glasses 101 according to the embodiment, the first response time T1 and the second response time T2 are set to be not more than 5 ms.

It is well known that when the switching time of the liquid crystal shutter that is used cannot keep up with the switching operation to change between the left-eye image and the right-eye image, normal stereoscopic images cannot be obtained. However, there are no known examples of a value being derived for the response time necessary to suppress fatigue and discomfort.

To realize such a response time, it is desirable to use, for example, an OCB (Optically Compensated Bend) liquid crystal based on pi-cells (splay-aligned cells) in the left-eye liquid crystal shutter 110 and the right-eye liquid crystal shutter 120. Specifically, the left-eye liquid crystal shutter 110 and the right-eye liquid crystal shutter 120 may include a bend-aligned liquid crystal layer.

Through use of an appropriately designed OCB liquid crystal, it is possible to achieve a response time of not more than 5 ms in a practical operating voltage range. Further, due to use of nematic liquid crystal in the OCB liquid crystal, resistance to mechanical shock and thermal shock can be secured, making it easier to secure long-term operational reliability.

Note, however, that as described below, the condition of the first response time T1 and the second response time T2 being not more than 5 ms is insufficient to suppress fatigue and discomfort and allow comfortable viewing of stereoscopic images.

A second cause of fatigue and discomfort to the user was seen in angle of sight characteristics of the liquid crystal shutter, which were found to strongly affect fatigue and discomfort. This cause is described below.

The inventors conducted an investigation relating to viewing conditions when the stereoscopic image display system was actually used to watch stereoscopic images such as movies. It was discovered that angle of sight characteristics of optical switching of the liquid crystal shutter strongly affected fatigue and discomfort.

Figure 4:
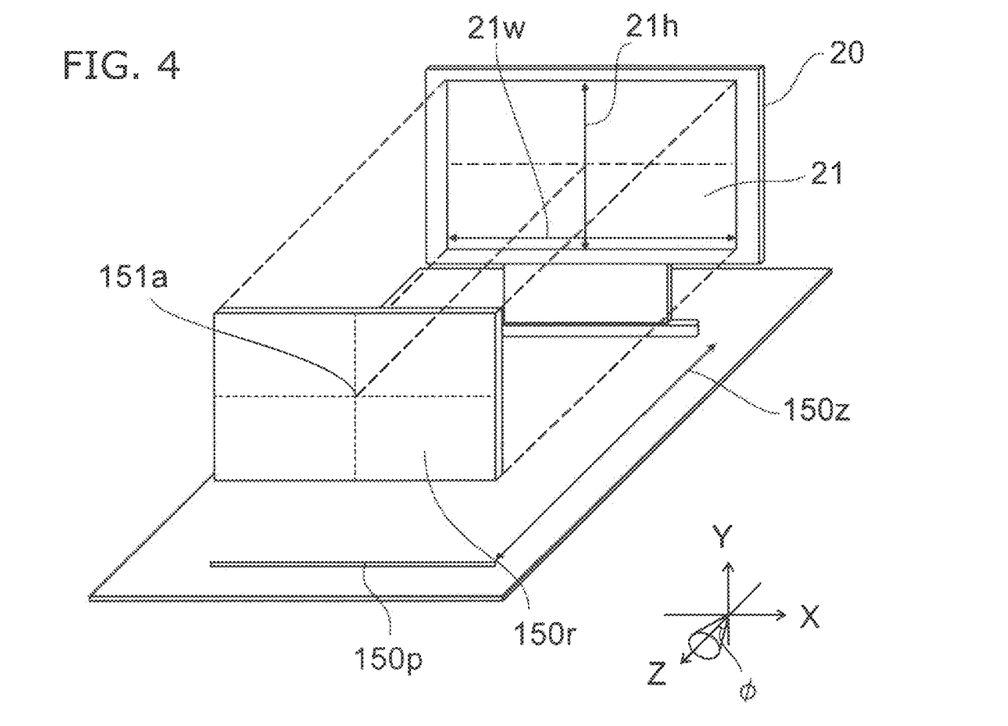
FIG. 4 is a schematic view illustrating a usage state of the stereoscopic image display system.

FIG. 4 is a schematic view illustrating a usage state of the stereoscopic image display system.

As illustrated in FIG. 4, a length of the left and right directions of the display screen 21 of the display device 20 is denoted as a screen horizontal width 21w and a height of an up and down direction is denoted as a screen vertical height 21h. In addition, a distance between a viewing position 150p of the viewer and the display screen 21 is denoted as a viewing distance 150z.

A ratio between the screen horizontal width 21w and the screen vertical height 21h is, for instance, 16:9.

Here, a Z-axis direction is set as the direction from the display screen 21 to the viewing position 150p (depth direction), the left and right direction is set as an X-axis direction, and the up and down direction is set as a Y-axis direction.

The central position of the viewer's left and right eyes (hereinafter referred to as an eye position) is arranged to be within a viewing region 150r set at exactly the viewing distance 150z from the display screen 21.

From the results of the investigation of the conditions for viewing stereoscopic images in movies and the like, it was found that the viewer views the display screen 21 approximately from a center 151a of the viewing region 150r. The center 151a of the viewing region 150r is positioned on a line extending along the Z-axis direction from a center 21c of the display screen 21. Viewing from the center 151a of the viewing region 150r makes it is easy for the viewer to view the stereoscopic image in a favorable manner.

In a two-dimensional display system that is not stereoscopic, the viewer position (viewing distance and viewing region) are relatively free. For instance, in the case of television images on a normal two-dimensional display, it is common for a viewer to be doing other things (such as reading a newspaper, eating, having a conversation) while viewing the images.

From the results of the investigation into the practical usage conditions of the stereoscopic image display system when viewing movies and the like, it was found that the viewing of images while doing something else was uncommon as a usage state for the stereoscopic image display system. In addition, when viewing the stereoscopic images, viewers commonly view the stereoscopic images from the center 151a of the viewing region 150r at the viewing distance 150z, such as described above.

An angle of sight ϕ of the viewer when the eye position is arranged to be within the center 151a of the viewing region 150r is described below.

When the eye position is set at the center 151a of the viewing region 150r, the angles of sight ϕ between the eye position and the left and right edges of the display screen 21 are 32.2 degrees to the left and right, respectively. Moreover, the angles of sight ϕ between the eye position and upper and lower edges of the display screen 21 are 18.4 degrees to the left and right, respectively.

Thus, when the actual usage state of the viewer is considered, it is desirable that the optical switching characteristics (such as the contrast ratio) of the liquid crystal shutter are favorable for angles of sight ϕ in a range of ±32.2 degrees in the left and right directions and angles of sight ϕ in a range of ±18.4 degrees in the up and down directions. The following description relates to the angles in the left and right directions, which are larger than the angles in the vertical direction.

Even when a favorable contrast ratio is obtained, for instance, for directly in front of the liquid crystal shutter (angle of sight φ of zero (0) degrees), if the contrast ratio is low at 32.2 degrees in the left and right directions, both the left-eye image and the right-eye image will be presented to the viewer as images at the edges of the left and right directions. As a result, the visual sense of the viewer will work to correct the image having the disparity between the left-eye image and the right-eye image. Consequently, in cases when angle of sight characteristics of the liquid crystal shutter are poor, fatigue and discomfort can easily occur. The phenomenon by which the left-eye image and right eye image are simultaneously provided to the viewer as a result of the angle of sight characteristics of the liquid crystal shutter is known as "3D crosstalk".

The inventors discovered that 3D crosstalk varied between when liquid crystal shutters with favorable angle of sight characteristics were used and when liquid crystal shutters with poor angle of sight characteristics were used, and that the degree of fatigue and discomfort change greatly. They focused on this characteristic. The inventors then investigated the angle of sight characteristics of the optical switching characteristics (contrast ratio) of the liquid crystal shutter, and the perception characteristics of stereoscopic viewing.

Here, the contrast ratio is the ratio between the transmission in the light-blocking state (for example, the first transmission Tr1) and the transmission in the light-transmitting state (for example, the second transmission Tr2) of the liquid crystal shutter.

The results of the investigation into the angle of sight characteristics of the liquid crystal shutter are described below.

Figure 5:
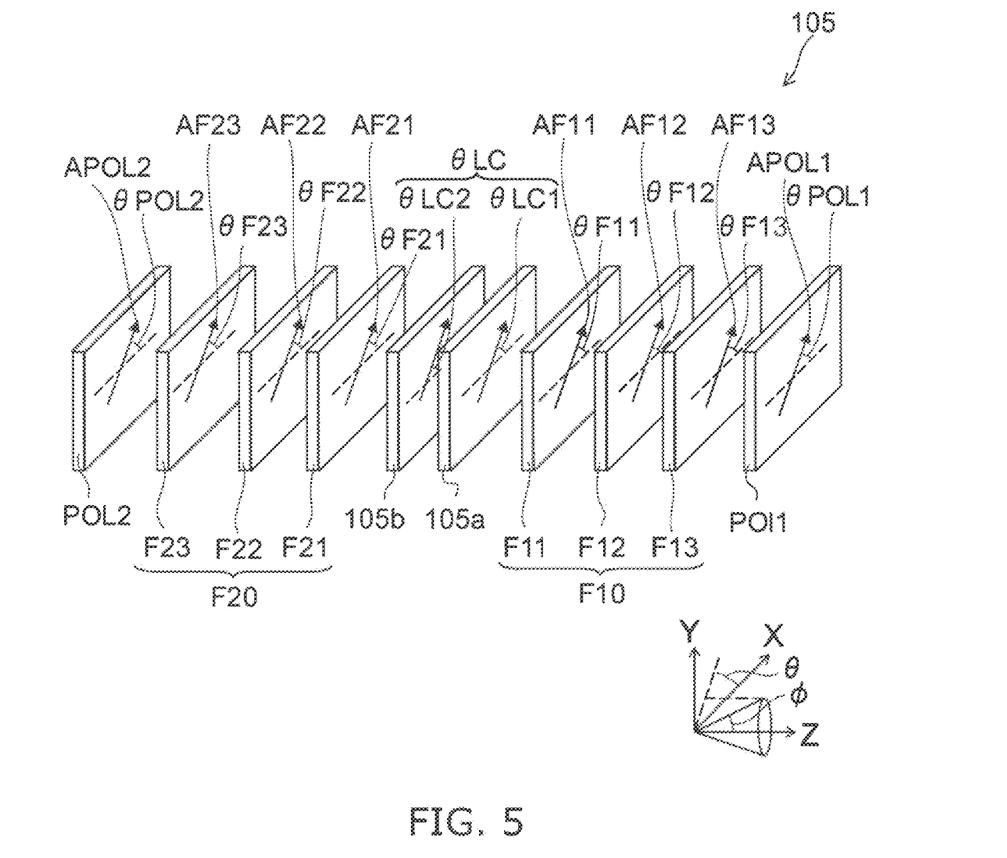
FIG. 5 is a schematic perspective view illustrating the configuration of the liquid crystal shutter of the stereoscopic liquid crystal shutter glasses.

FIG. 5 is a schematic perspective view illustrating the configuration of the liquid crystal shutter of the stereoscopic liquid crystal shutter glasses.

A liquid crystal shutter 105 which represents the left-eye liquid crystal shutter 110 and the right-eye liquid crystal shutter 120 in a case where the two have similar configurations and characteristics is described below.

The liquid crystal shutter 105 has a first liquid crystal substrate 105a and a second liquid crystal substrate 105b. The first liquid crystal substrate 105a is positioned on the viewer side, and the second liquid crystal substrate 105b is positioned on the display device 20 side. A liquid crystal layer not illustrated in the drawings is provided between the first liquid crystal substrate 105a and the second liquid crystal substrate 105b. An angle between an orientation direction of liquid crystal molecules (direction of the longitudinal axis of the liquid crystal molecules) in the first liquid crystal substrate 105a and the X-axis direction is denoted as a first liquid crystal orientation direction angle θLC1. An angle between an orientation direction of liquid crystal molecules (direction of the longitudinal axis of liquid crystal molecules) in the second liquid crystal substrate 105b and the X-axis direction is denoted as a second liquid crystal orientation direction angle θLC2. In this investigation, liquid crystal layers with an OCB mode were used as the liquid crystal layers. The first liquid crystal orientation direction angle θLC1 and the second liquid crystal orientation direction angle θLC2 were the same and are both denoted as a liquid crystal orientation angle θLC.

A first polarizing plate POL1 is provided on a side of the first liquid crystal substrate 105a opposite the second liquid crystal substrate 105b. The first polarizing plate POL1 is the polarizing plate on the viewer side. A second polarizing plate POL2 is provided on a side of the second liquid crystal substrate 105b opposite the first liquid crystal substrate 105a. The second polarizing plate POL2 is the polarizing plate on the display device 20 side. An angle between an absorption axis (first absorption axis APOL1) of the first polarizing plate POL1 and the X-axis direction is denoted as a first polarizing plate angle θPOL1. An angle between an absorption axis (second absorption axis APOL2) of the second polarizing plate POL2 and the X-axis direction is denoted as a second polarizing plate angle θPOL2.

A viewer-side optical layer F10 is provided between the first liquid crystal substrate 105a and the first polarizing plate POL1, and a display device-side optical layer F20 is provided between the second liquid crystal substrate 105b and the second polarizing plate POL2.

For example, a first viewer-side optical layer F11 may be provided between the first liquid crystal substrate 105a and the first polarizing plate POL1. An angle between a first viewer-side optical axis AF11 of first viewer-side optical layer F11 and the X-axis direction is denoted as a first viewer-side optical layer angle θF11.

A first display device-side optical layer F21 may be provided between the second liquid crystal substrate 105b and the second polarizing plate POL2. An angle between a first display device-side optical axis AF21 of the first display device-side optical layer F21 and the X-axis direction is denoted as a first display device-side optical layer angle θF21.

A second viewer-side optical layer F12 may be provided between the first viewer-side optical layer F11 and the first polarizing plate POL1. An angle between a second viewer-side optical axis AF12 of the second viewer-side optical layer F12 and the X-axis direction is denoted as a second viewer-side optical layer angle θF12.

A second display device-side optical layer F22 may be provided between the first display device-side optical layer F21 and the second polarizing plate POL2. An angle between a second display device-side optical axis AF22 of the second display device-side optical layer F22 and the X-axis direction is denoted as a second display device-side optical layer angle θF22.

A third viewer-side optical layer F13 may be provided between the second viewer-side optical layer F12 and the first polarizing plate POL1. An angle between a third viewer-side optical axis AF13 of the third viewer-side optical layer F13 and the X-axis direction is denoted as a third viewer-side optical layer angle θF13.

A third display device-side optical layer F23 may be provided between the second display device-side optical layer F22 and the second polarizing plate POL2. An angle between a third display device-side optical axis AF23 of the third display device-side optical layer F23 and the X-axis direction is denoted as a third display-device-side optical layer angle θF23.

As illustrated in FIG. 5, the angle of sight φ is a polar angle measured with respect to the Z-axis direction. The azimuth angles θ are measured in degrees with respect to the X-axis direction.

Figure 6:
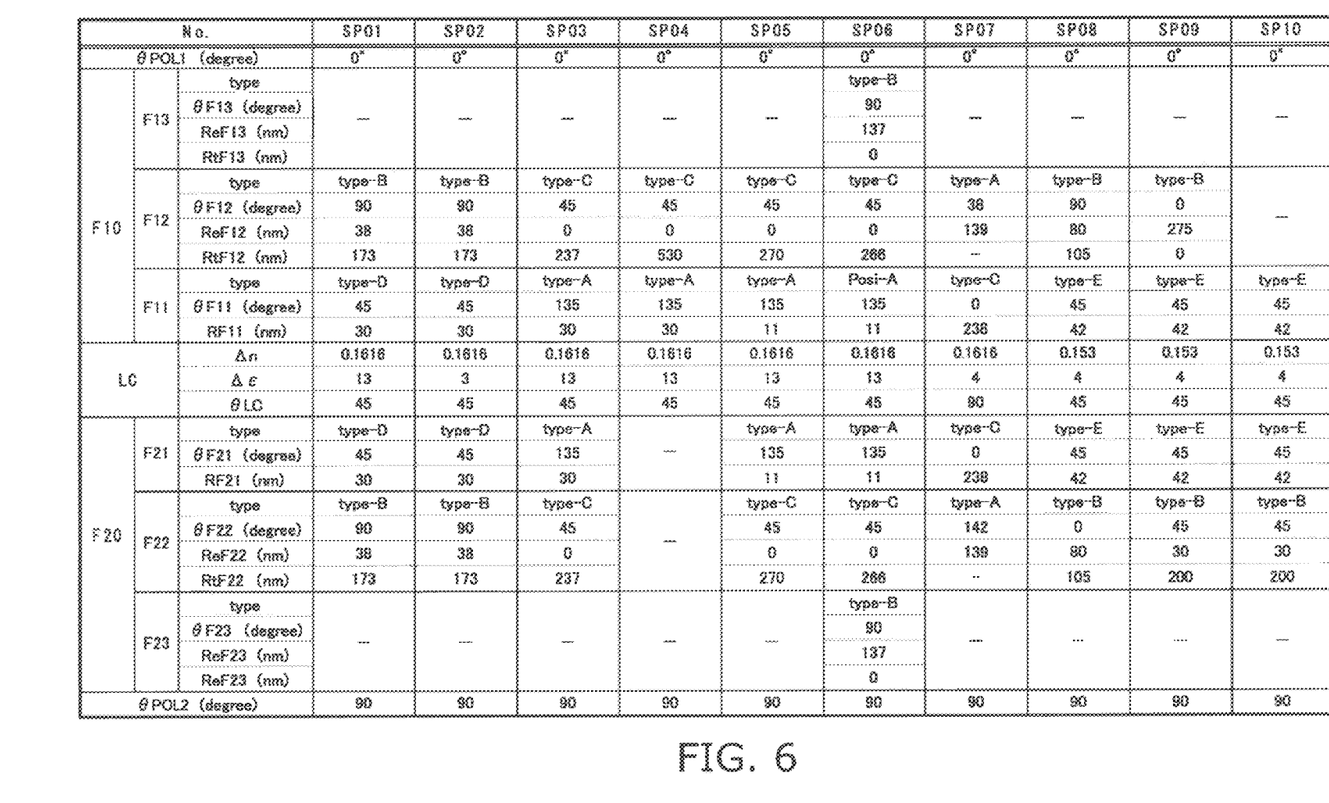
FIG. 6 is a table showing configurations of the liquid crystal shutter.

FIG. 6 is a table showing configurations of the liquid crystal shutter.

As shown in FIG. 6, 10 types of liquid crystal shutters SP01 to SP10 were considered in this investigation. The optical constituents included in each of the liquid crystal shutters SP01 to SP10 and associated conditions are as shown in FIG. 6.

In FIG. 6, RF11 is a retardation of the first viewer-side optical layer F11. Specifically, in the liquid crystal shutters SP01 to SP06, and SP08 to SP10, RF11 is a retardation in an in-plane direction of the first viewer-side optical layer F11. In the liquid crystal shutter SP07, RF11 is a retardation in a thickness direction of the first viewer-side optical layer F11.

RF21 is a retardation of the first display device-side optical layer F21. Specifically, in the liquid crystal shutters SP01 to SP06, and SP08 to SP10, RF21 is a retardation in an in-plane direction of the first display device-side optical layer F21. In the liquid crystal shutter SP07, RF21 is a retardation in a thickness direction of the first display device-side optical layer F21.

ReF12 and ReF13 are retardations in the in-plane direction of the second and third viewer-side optical layers F12 and F13, respectively. ReF22 and ReF23 are retardations in the in-plane direction of the second and third display device-side optical layers F22 and F23, respectively.

Also, RtF12 and RtF13 are retardations in the thickness-direction of the second and third viewer-side optical layers F12 and F13, respectively. RtF22 and RtF23 are retardations in the thickness-direction of the second and third display device-side optical layers F22 and F23, respectively.

Further, $\Delta n$ is a birefringence of the liquid crystal layer at 550 manometers (nm), and $\Delta \in$ is an dielectric anisotropy of the liquid crystal layer.

The "types" of the first, second and third viewer-side optical layers F11, F12 and F13 and of the first, second and third display device optical layers F21, F22 and F23 are described below. "Type-A" is an optical film having a positive refractive index anisotropy. "Type B" is a biaxial optical film. "Type-C" is an optical film having negative refractive index anisotropy. "Type-D" is an optical film having negative optical anisotropy with an angle of the optical axis varying along a thickness direction. "Type-E" is a stacked optical film including a layer having negative optical anisotropy with the angle of the optical axis varying along the thickness direction, and a biaxial optical layer.

Optical characteristics of the 10 types of liquid crystal shutters SP01 to SP10 having the configurations illustrated in FIG. 6 were simulated.

FIGS. 7A to 7D, FIGS. 8A to 8D and FIGS. 9A and 9B are schematic views illustrating characteristics of the liquid crystal shutters.

In the drawings, a plurality of concentric circles are plotted. The innermost circle corresponds to an angle of sight $\phi$ of 20 degrees, the next circle to an angle of sight $\phi$ of 40 degrees, the next circle to an angle of sight $\phi$ of 60 degrees, and the outermost circle to an angle of sight $\phi$ of 80 degrees.

In the drawings, the darkly shaded region corresponds to a region where the contrast ratio is high, and the lightly shaded region to a region where the contrast ratio is low. In the drawings, outer and inner curved lines are drawn with two solid lines. The outer solid line corresponds to a contrast ratio of 100:1. The region within the outer solid line corresponds to a region where the contrast ratio is higher than 100:1. The inner solid line corresponds to a contrast ratio of 500:1. The region within the inner solid line corresponds to a region where the contrast ratio is higher than 500:1.

As illustrated in FIGS. 7A to 7D, FIGS. 8A to 8D, and FIGS. 9A and 9B, the dependency of the contrast ratio on the angle of sight $\phi$ varies greatly according to the configuration of the liquid crystal shutter 105.

Figure 7A:
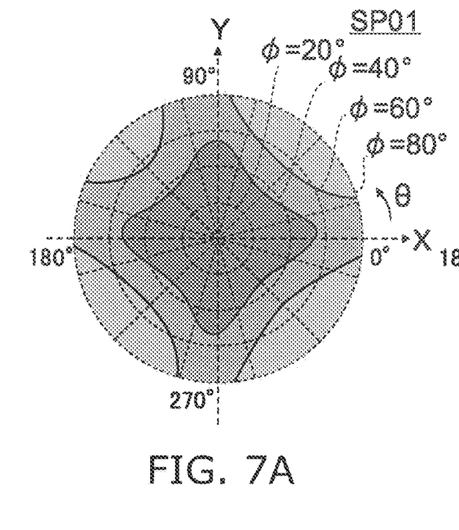
FIGS. 7A to 7D are schematic views illustrating characteristics of the liquid crystal shutters.
Figure 7B:
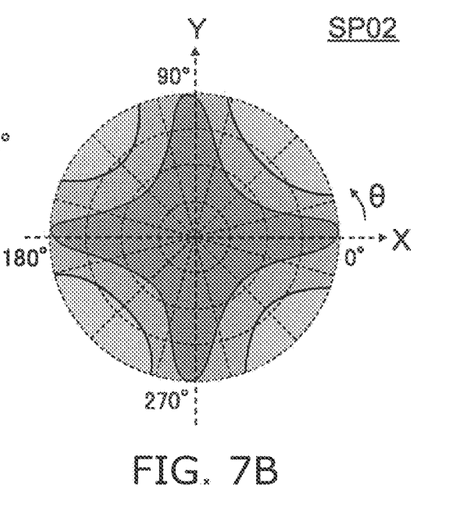

In the liquid crystal shutter SP01 illustrated in FIG. 7A and the liquid crystal shutter SP02 illustrated in FIG. 7B, the angle of sight $\phi$ region obtained with a high contrast ratio is large.

Figure 7C:
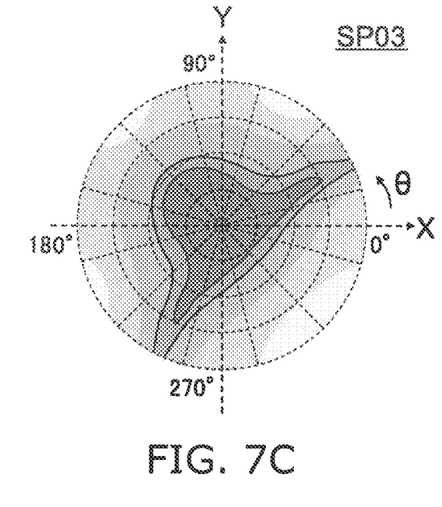
Figure 7D:
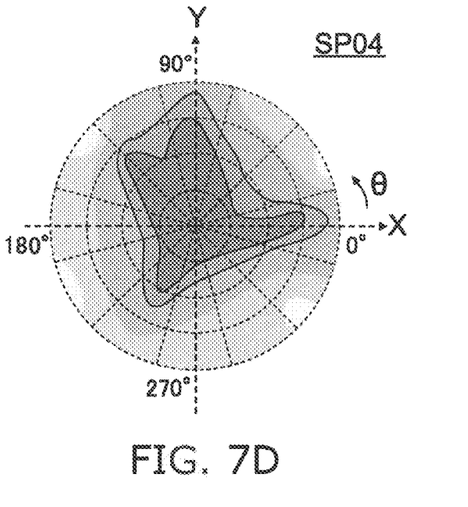

In the liquid crystal shutter SP03 illustrated in FIG. 7C and the liquid crystal shutter SP04 illustrated in FIG. 7D, the angle of sight $\phi$ region obtained with a high contrast ratio is markedly small.

Figure 8A:
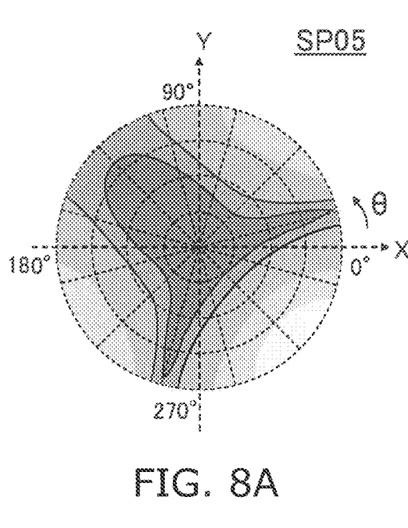
FIGS. 8A to 8D are schematic views illustrating characteristics of the liquid crystal shutters.
Figure 8B:
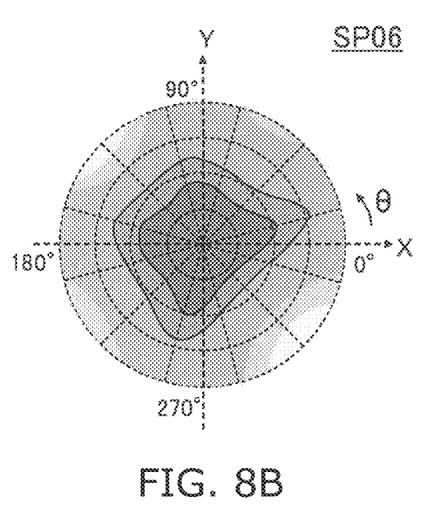
Figure 8C:
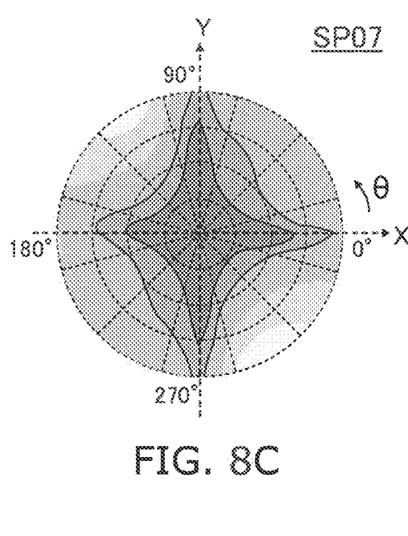

In the liquid crystal shutter SP05 illustrated in FIG. 8A, the liquid crystal shutter SP06 illustrated in FIG. 8B, and the liquid crystal shutter SP07 illustrated in FIG. 8C, the angle of sight $\phi$ region obtained with a high contrast ratio is smaller than those obtained for the liquid crystal shutters SP01 and SP02 but larger than those obtained for the liquid crystal shutters SP03 and SP04.

Figure 8D:
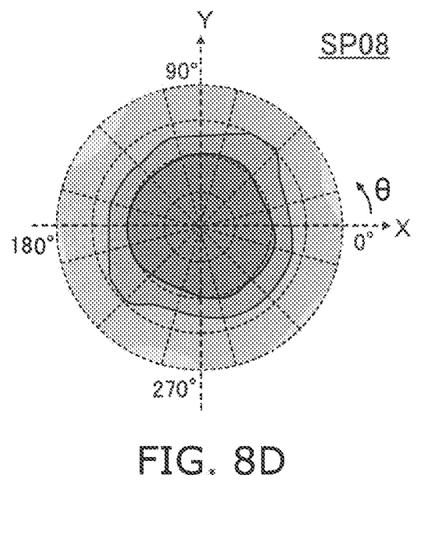
Figure 9A:
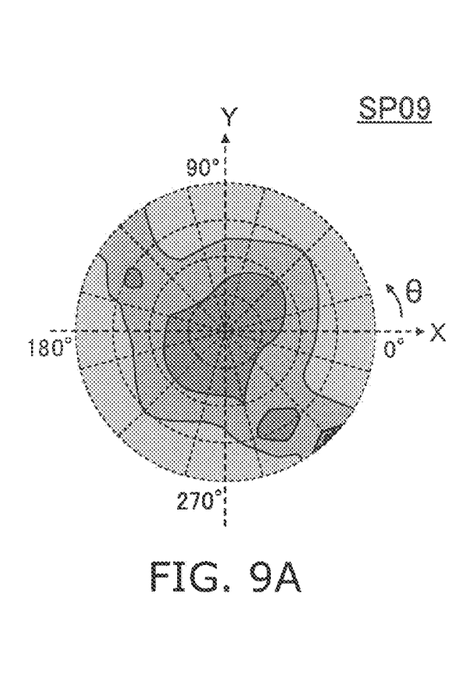
FIGS. 9A and 9B are schematic views illustrating characteristics of the liquid crystal shutters.
Figure 9B:
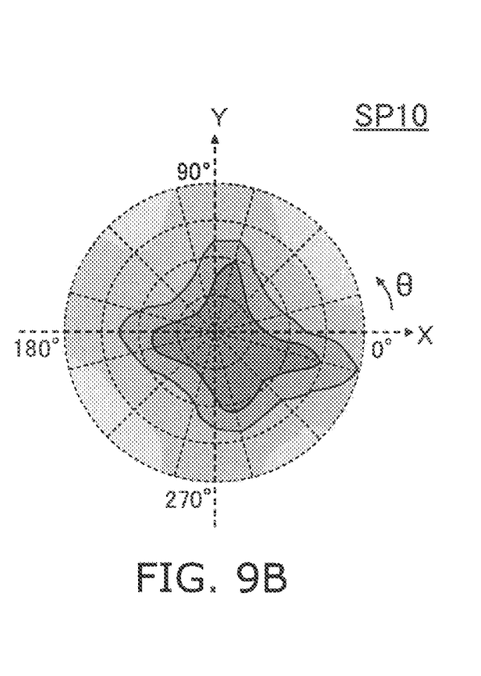

Also, in the liquid crystal shutter SP08 illustrated in FIG. 8D, the liquid crystal shutter SP09 illustrated in FIG. 9A, and the liquid crystal shutter SP10 illustrated in FIG. 9B, the angle of sight $\phi$ region obtained with a high contrast ratio is smaller than those obtained for the liquid crystal shutters SP01 and SP02 but larger than those obtained for the liquid crystal shutters SP03 and SP04.

The liquid crystal shutter SP01, which has favorable angle of sight characteristics in comparison to the other described shutters, was actually manufactured and used in experiments with a stereoscopic image system. The result was favorable stereoscopic viewing without substantial fatigue or discomfort. The response time of the liquid crystal shutter in this case was not more than 5 ms.

On the other hand, when the liquid crystal shutters corresponding to the liquid crystal shutters SP03 and SP04, which do not have favorable angle of sight characteristics, were actually used in a stereoscopic image system, fatigue and discomfort occurred. In this reference example, the response time of the shutter was not more than 5 ms. Thus, it was found that, even when the response time satisfies the 5 ms condition, if the angle of sight characteristics are poor, three-dimensional crosstalk causes fatigue and discomfort when the stereoscopic image system is put into practical use.

From the results of the experiment, it was confirmed that, provided the contrast ratio is not less than 350:1 when the angle of sight $\phi$ is 30 degrees in the left and right directions, substantially, fatigue and discomfort do not occur and favorable stereoscopic viewing can be obtained. It was further confirmed that if the contrast ratio is not at least 350:1 when the angle of sight $\phi$ in the left and right directions is 30 degrees, fatigue and discomfort occur more easily. In other words, using a liquid crystal shutter with a contrast ratio of not less than 350:1 when the angle of sight $\phi$ in the left and right directions is 30 degrees enables suppression of the 3D crosstalk particular to stereoscopic viewing.

For example, in the above-described liquid crystal shutter SP03, when the angle of sight $\phi$ in the right direction is 30 degrees, the contrast ratio is 312; and when the angle of sight $\phi$ in the left direction is 30 degrees, the contrast ratio is 337. In the liquid crystal shutter SP04, when angle of sight $\phi$ in the right direction is 30 degrees, the contrast ratio is high at 1276; but when the angle of sight $\phi$ in the left direction is 30 degrees, the contrast ratio is markedly low at 106. If these liquid crystal shutters were used, 3D crosstalk would occur.

On the other hand, in the liquid crystal shutter SP01, for instance, when the angle of sight $\phi$ in the right direction is 30 degrees, the contrast ratio is 3064; and when the angle of sight $\phi$ in the left direction is 30 degrees, the contrast ratio is 3293. In the liquid crystal shutter SP02, when the angle of sight $\phi$ in the right direction is 30 degrees, the contrast ratio is 3998; and when the angle of sight $\phi$ in the left direction is 30 degrees, the contrast ratio is 4270.

In the liquid crystal shutter SP05, for instance, when the angle of sight $\phi$ in the right direction is 30 degrees, the contrast ratio is 1003; and when the angle of sight $\phi$ in the left direction is 30 degrees, the contrast ratio is 1072. In the liquid crystal shutter SP06, when the angle of sight $\phi$ in the right direction is 30 degrees, the contrast ratio is 1003; and when the angle of sight φ in the left direction is 30 degrees, the contrast ratio is 1072.

In the liquid crystal shutter SP07, for instance, when the angle of sight φ in the right direction is 30 degrees, the contrast ratio is 2506; and when the angle of sight φ in the left direction is 30 degrees, the contrast ratio is 1061. In the liquid crystal shutter SP08, for instance, when the angle of sight φ in the right direction is 30 degrees, the contrast ratio is 2339; and when the angle of sight φ in the left direction is 30 degrees, the contrast ratio is 2428.

In the liquid crystal shutter SP09, for instance, when the angle of sight φ in the right direction is 30 degrees, the contrast ratio is 412; and when the angle of sight φ in the left direction is 30 degrees, the contrast ratio is 578. In the liquid crystal shutter SP10, for instance, when the angle of sight φ in the right direction is 30 degrees, the contrast ratio is 412; and when the angle of sight φ in the left direction is 30 degrees, the contrast ratio is 578.

In the above-described liquid crystal shutters SP01, SP02, SP05, SP06, SP07, SP08, SP09 and SP10, the angle of sight characteristics are within the permissible range, and 3D crosstalk can be suppressed. In the liquid crystal shutter SP01 and SP02, the angle of sight characteristics are especially favorable, and 3D crosstalk can be suppressed with particular effectiveness.

The condition of 30 degrees as the angle of sight φ at which to obtain a favorable contrast ratio (contrast ratio is not less than 350:1) closely matches the fact that, when the above-described stereoscopic image system is actually used to view movies or the like, the angle of sight φ on each of the left and right is required to be 32.2 degrees. The close match gives validity to this approach. Moreover, it can be supposed that the viewer's visual sense is not strongly affected by the edge portions of the images, and, hence, that the above-described values of 30 degrees and 32.2 degrees can be considered to be substantially the same value.

Thus, using the liquid crystal shutter with a contrast ratio of not less than 350:1 when the angles of sight φ in the left and right directions are each 30 degrees enables suppression of the 3D crosstalk particular to stereoscopic viewing.

It is well-known in a qualitative sense that a short response time of a liquid crystal shutter used in a stereoscopic image system is desirable, but with this investigation, the inventors quantified a favorable response time for the liquid crystal shutter. Further, from a practical perspective, it was discovered that not only response time, but also angle of sight characteristics were important. Favorable angle of sight characteristics were quantitatively investigated.

In the stereoscopic liquid crystal shutter glasses 101 according to the embodiment, the response times of each of the left-eye liquid crystal shutter 110 and the right-eye liquid crystal shutter 120 are not more than 5 ms, and the contrast ratio, when the angle of sight φ in each of the left and right directions of the left-eye liquid crystal shutter 110 and the right-eye liquid crystal shutter 120 are 30 degrees, is set to be not less than 350:1. Consequently, fatigue and discomfort are suppressed and it is possible to provide stereoscopic liquid crystal shutter glasses that allow stereoscopic images to be viewed comfortably.

It is more preferable that the contrast ratio when the angle of sight φ in the left and right directions is 30 degrees is not less than 1000:1. In other words, more favorable characteristics can be obtained in the above-described liquid crystal shutters SP01, SP02, SP05, SP06, SP07 and SP08.

It is more preferable that the contrast ratio when the angle of sight φ in the left and right directions is 30 degrees is not less than 3000:1. Specifically, more favorable characteristics are obtained in the above-described liquid crystal shutters SP01, SP02.

Further, as described above, the left-eye liquid crystal shutter 110 and the right-eye liquid crystal shutter 120 may each include optical layers. The optical layers preferably include a layer having negative optical anisotropy with the angle of the optical axis varying along the thickness direction. Specifically, it is possible to use, for instance, the "type-D" or "type-E" arrangements described above. With such arrangements, it is possible to obtain a contrast ratio that is not less than 350:1 when the angle of sight φ in the left and right directions is 30 degrees.

According to the embodiment, stereoscopic liquid crystal shutter glasses and a stereoscopic image display system that suppress fatigue and discomfort and allow comfortable viewing of stereoscopic images are provided.

An embodiment of the invention with reference to examples was described above. However, the invention is not limited to these examples. The scope of the invention includes all cases in which, for example, a person skilled in the art could make use of publicly known information to appropriately select configuration elements such as the liquid crystal shutter and holding part included in the stereoscopic liquid crystal shutter glasses and the display device and control unit included in the stereoscopic image display system provided that the invention is conducted in the same manner and that the same effects are achieved.

Additionally, combinations of constituents from two or more of the examples are also included in the scope of the invention, provided they are technically possible and do not depart from the spirit of the invention.

Moreover, provided they do not depart from the spirit of the invention, all stereoscopic liquid crystal shutter glasses and stereoscopic image display systems obtained when a person skilled in the art makes appropriate variations based on the stereoscopic liquid crystal shutter glasses and the stereoscopic image display system described in the embodiment of the invention are included in the scope of the invention.

Furthermore, regarding the scope of the spirit of the invention, it is understood that a variety of variations and modifications could be conceived by a person skilled in the art and that these variations and modifications all fall within the scope of the invention as well. For instance, in the above described embodiment, when constituent elements are appropriately added, removed or changed in design by a person skilled in the art, processes are added or omitted, or conditions are modified; provided that the resulting configuration does not depart from the spirit of the invention, it falls within in the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. Stereoscopic liquid crystal shutter glasses comprising:
a left-eye liquid crystal shutter; and
a right-eye liquid crystal shutter;

each of the left-eye liquid crystal shutter and the right-eye liquid crystal shutter having a response time not more than 5 milliseconds;
each of the left-eye liquid crystal shutter and the right-eye liquid crystal shutter having a contrast ratio not less than 350:1, the contrast ratio being a value at an angle of sight of 30 degrees in left direction and in right direction;
wherein the left-eye liquid crystal shutter and the right-eye liquid crystal shutter include a bend-aligned liquid crystal layer; and
wherein the left-eye liquid crystal shutter further includes:
  a first polarizing plate;
  a second polarizing plate;
  a first viewer-side optical layer;
  a second viewer-side optical layer;
  a first display device side optical layer; and
  a second display device side optical layer,
  the bend-aligned liquid crystal layer is disposed between the first polarizing plate and the second polarizing plate,
  the first viewer-side optical layer is disposed between the first polarizing plate and the bend-aligned liquid crystal layer,
  the second viewer-side optical layer is disposed between the first polarizing plate and the first viewer-side optical layer,
  the first display device-side optical layer is disposed between the second polarizing plate and the bend-aligned liquid crystal layer,
  the second display-device side optical layer is disposed between the second polarizing plate and the first display-device side optical layer,
  an angle between a first absorption axis of the first polarizing plate and a liquid crystal alignment axis of the bend-aligned liquid crystal layer is 45 degrees,
  a second absorption axis of the second polarizing plate is perpendicular to the first absorption axis and an angle between the second absorption axis and the liquid crystal alignment axis is 45 degrees,
  a retardation of the first viewer-side optical layer is equal to a retardation of the second viewer-side optical layer, and
  a retardation of the first display device-side optical layer is equal to a retardation of the second display device-side optical layer.

2. Stereoscopic liquid crystal shutter glasses comprising:
a left-eye liquid crystal shutter; and
a right-eye liquid crystal shutter;
each of the left-eye liquid crystal shutter and the right-eye liquid crystal shutter having a response time not more than 5 milliseconds;
each of the left-eye liquid crystal shutter and the right-eye liquid crystal shutter having a contrast ratio not less than 350:1, the contrast ratio being a value at an angle of sight of 30 degrees in left direction and in right direction;
wherein the left-eye liquid crystal shutter and the right-eye liquid crystal shutter include a bend-aligned liquid crystal layer; and
wherein the left-eye liquid crystal shutter further includes:
  a first polarizing plate;
  a second polarizing plate;
  a first viewer-side optical layer;
  a second viewer-side optical layer;
  a first display device-side optical layer; and
  a second display device-side optical layer,
  the bend-aligned liquid crystal layer is disposed between the first polarizing plate and the second polarizing plate,
  the first viewer-side optical layer is disposed between the first polarizing plate and the bend-aligned liquid crystal layer,
  the second viewer-side optical layer is disposed between the first polarizing plate and the first viewer-side optical layer,
  the first display device-side optical layer is disposed between the second polarizing plate and the bend-aligned liquid crystal layer,
  the second display device-side optical layer is disposed between the second polarizing plate and the first display device-side optical layer,
  an angle between a first absorption axis of the first polarizing plate and a liquid crystal alignment axis of the bend-aligned liquid crystal layer is 45 degrees,
  a second absorption axis of the second polarizing plate is perpendicular to the first absorption axis and an angle between the second absorption axis and the liquid crystal alignment axis is 45 degrees,
  an angle between an optical axis of the first viewer-side optical layer and the first absorption axis is equal to an angle between an optical axis of the second viewer-side optical layer and the first absorption axis, and
  an angle between an optical axis of the first display device-side optical layer and the first absorption axis is equal to an angle between an optical axis of the second display device-side optical layer and the first absorption axis.

3. Stereoscopic liquid crystal shutter glasses comprising:
a left-eye liquid crystal shutter; and
a right-eye liquid crystal shutter;
each of the left-eye liquid crystal shutter and the right-eye liquid crystal shutter having a response time not more than 5 milliseconds;
each of the left-eye liquid crystal shutter and the right-eye liquid crystal shutter having a contrast ratio not less than 350:1, the contrast ratio being a value at an angle of sight of 30 degrees in left direction and in right direction;
wherein the left-eye liquid crystal shutter and the right-eye liquid crystal shutter include a bend-aligned liquid crystal layer; and
wherein the left-eye liquid crystal shutter further includes:
  a first polarizing plate;
  a second polarizing plate;
  a first viewer-side optical layer;
  a second viewer-side optical layer;
  a first display device-side optical layer; and
  a second display device-side optical layer,
  the bend-aligned liquid crystal layer is disposed between the first polarizing plate and the second polarizing plate,
  the first viewer-side optical layer is disposed between the first polarizing plate and the bend-aligned liquid crystal layer,
  the second viewer-side optical layer is disposed between the first polarizing plate and the first viewer-side optical layer,
  the first display device-side optical layer is disposed between the second polarizing plate and the bend-aligned liquid crystal layer,
  the second display device-side optical layer is disposed between the second polarizing plate and the first display device-side optical layer, an angle between a first absorption axis of the first polarizing plate and a liquid crystal alignment axis of the bend-aligned liquid crystal layer is 45 degrees, a second absorption axis of the second polarizing plate is perpendicular to the first absorption axis and the angle between the second absorption axis and the liquid crystal alignment axis is 45 degrees, an angle between an optical axis of the first viewer-side optical layer and the first absorption axis is 45 degrees, and a retardation of the first viewer-side optical layer is 30 nm, an angle between an optical axis of the second viewer-side optical layer and the first absorption axis is 90 degrees, an in-plane retardation of the second viewer-side optical layer is 38 nm and a thickness direction retardation of the second viewer-side optical layer is 173 nm, an angle between an optical axis of the first display device-side optical layer and the first absorption axis is 45 degrees, and a retardation of the first display device-side optical layer is 30 nm, and an angle between an optical axis of the second display device-side optical layer and the first absorption axis is 90 degrees, an in-plane retardation of the second display device-side optical layer is 38 nm, and a thickness direction retardation of the second display device-side optical layer is 173 nm.

4. Stereoscopic liquid crystal shutter glasses comprising:
a left-eye liquid crystal shutter; and
a right-eye liquid crystal shutter;
each of the left-eye liquid crystal shutter and the right-eye liquid crystal shutter having a response time not more than 5 milliseconds;
each of the left-eye liquid crystal shutter and the right-eye liquid crystal shutter having a contrast ratio not less than 350:1, the contrast ratio being a value at an angle of sight of 30 degrees in left direction and in right direction;
wherein the left-eye liquid crystal shutter and the right-eye liquid crystal shutter include a bend-aligned liquid crystal layer; and
wherein the left-eye liquid crystal shutter further includes:
a first polarizing plate;
a second polarizing plate;
a first viewer-side optical layer;
a second viewer-side optical layer;
a first display device-side optical layer; and
a second display device-side optical layer,
the bend-aligned liquid crystal layer is disposed between the first polarizing plate and the second polarizing plate,
the first viewer-side optical layer is disposed between the first polarizing plate and the bend-aligned liquid crystal layer,
the second viewer-side optical layer is disposed between the first polarizing plate and the first viewer-side optical layer,
the first display device-side optical layer is disposed between the second polarizing plate and the bend-aligned liquid crystal layer,
the second display device-side optical layer is disposed between the second polarizing plate and the first display device-side optical layer,
an angle between a first absorption axis of the first polarizing plate and a liquid crystal alignment axis of the bend-aligned liquid crystal layer is 45 degrees,
a second absorption axis of the second polarizing plate is perpendicular to the first absorption axis and the angle between the second absorption axis and the liquid crystal alignment axis is 45 degrees, an angle between an optical axis of the first viewer-side optical layer and the first absorption axis is 135 degrees, and a retardation of the first viewer-side optical layer is 11 nm, an angle between an optical axis of the second viewer-side optical layer and the first absorption axis is 45 degrees, and a thickness direction retardation of the second viewer-side optical layer is 270 nm, an angle between an optical axis of the first display device-side optical layer and the first absorption axis is 135 degrees, and a retardation of the first display device-side optical layer is 11 nm, and an angle between an optical axis of the second display device-side optical layer and the first absorption axis is 450 degrees, and a thickness direction retardation of the second display device-side optical layer is 270 nm.

5. Stereoscopic liquid crystal shutter glasses comprising:
a left-eye liquid crystal shutter; and
a right-eye liquid crystal shutter;
each of the left-eye liquid crystal shutter and the right-eye liquid crystal shutter having a response time not more than 5 milliseconds;
each of the left-eye liquid crystal shutter and the right-eye liquid crystal shutter having a contrast ratio not less than 350:1, the contrast ratio being a value at an angle of sight of 30 degrees in left direction and in right direction;
wherein the left-eye liquid crystal shutter and the right-eye liquid crystal shutter include a bend-aligned liquid crystal layer; and
wherein the left-eye liquid crystal shutter further includes:
a first polarizing plate;
a second polarizing plate;
a first viewer-side optical layer;
a second viewer-side optical layer;
a first display device-side optical layer; and
a second display device-side optical layer,
the bend-aligned liquid crystal layer is disposed between the first polarizing plate and the second polarizing plate,
the first viewer-side optical layer is disposed between the first polarizing plate and the bend-aligned liquid crystal layer,
the second viewer-side optical layer is disposed between the first polarizing plate and the first viewer-side optical layer,
the first display device-side optical layer is disposed between the second polarizing plate and the bend-aligned liquid crystal layer,
the second display device-side optical layer is disposed between the second polarizing plate and the first display device-side optical layer,
an angle between a first absorption axis of the first polarizing plate and a liquid crystal alignment axis of the bend-aligned liquid crystal layer is 90 degrees,
a second absorption axis of the second polarizing plate is perpendicular to the first absorption axis and the angle between the second absorption axis and the liquid crystal alignment axis is 90 degrees,
an angle between an optical axis of the first viewer-side optical layer and the first absorption axis is 0 degrees, and a retardation of the first viewer-side optical layer is 238 nm,
an angle between an optical axis of the second viewer-side optical layer and the first absorption axis is 38 degrees, and an in-plane retardation of the second viewer-side optical layer is 139 nm, an angle between an optical axis of the first display device-side optical layer and the first absorption axis is 0 degrees, and a retardation of the first display device-side optical layer is 238 nm, and an angle between an optical axis of the second display device-side optical layer and the first absorption axis is 142 degrees, and an in-plane retardation of the second display device-side optical layer is 139 nm.

6. Stereoscopic liquid crystal shutter glasses comprising:
a left-eye liquid crystal shutter; and
a right-eye liquid crystal shutter;
each of the left-eye liquid crystal shutter and the right-eye liquid crystal shutter having a response time not more than 5 milliseconds;
each of the left-eye liquid crystal shutter and the right-eye liquid crystal shutter having a contrast ratio not less than 350:1, the contrast ratio being a value at an angle of sight of 30 degrees in left direction and in right direction;
wherein the left-eye liquid crystal shutter and the right-eye liquid crystal shutter include a bend-aligned liquid crystal layer; and
wherein the left-eye liquid crystal shutter further comprises:
a first polarizing plate;
a second polarizing plate;
a first viewer-side optical layer;
a second viewer-side optical layer;
a first display device-side optical layer; and
a second display device-side optical layer,
the bend-aligned liquid crystal layer is disposed between the first polarizing plate and the second polarizing plate;
the first viewer-side optical layer is disposed between the first polarizing plate and the bend-aligned liquid crystal layer,
the second viewer-side optical layer is disposed between the first polarizing plate and the first viewer-side optical layer,
the first display device-side optical layer is disposed between the second polarizing plate and the bend-aligned liquid crystal layer,
the second display device-side optical layer is disposed between the second polarizing plate and the first display device-side optical layer,
an angle between a first absorption axis of the first polarizing plate and a liquid crystal alignment axis of the bend-aligned liquid crystal layer is 45 degrees,
a second absorption axis of the second polarizing plate is perpendicular to the first absorption axis and the angle between the second absorption axis and the liquid crystal alignment axis is 45 degrees,
an angle between an optical axis of the first viewer-side optical layer and the first absorption axis is 45 degrees, and a retardation of the first viewer-side optical layer is 42 nm,
an angle between an optical axis of the second viewer-side optical layer and the first absorption axis is 90 degrees, an in-plane retardation of the second viewer-side optical layer is 80 nm and a thickness direction retardation of the first viewer-side optical layer is 105 nm,
an angle between an optical axis of the first display device-side optical layer and the first absorption axis is 45 degrees, and a retardation of the first display device-side optical layer is 42 nm, and an angle between an optical axis of the second display device-side optical layer and the first absorption axis is 0 degrees, an in-plane retardation of the second display device-side optical layer is 80 nm, and a thickness direction retardation of the second display device-side optical layer is 105 nm.

7. Stereoscopic liquid crystal shutter glasses comprising:
a left-eye liquid crystal shutter; and
a right-eye liquid crystal shutter;
each of the left-eye liquid crystal shutter and the right-eye liquid crystal shutter having a response time not more than 5 milliseconds;
each of the left-eye liquid crystal shutter and the right-eye liquid crystal shutter having a contrast ratio not less than 350:1, the contrast ratio being a value at an angle of sight of 30 degrees in left direction and in right direction;
wherein the left-eye liquid crystal shutter and the right-eye liquid crystal shutter include a bend-aligned liquid crystal layer; and
wherein the left-eye liquid crystal shutter further comprises:
a first polarizing plate;
a second polarizing plate;
a first viewer-side optical layer;
a second viewer-side optical layer;
a first display device-side optical layer; and
a second display device-side optical layer,
the bend-aligned liquid crystal layer is disposed between the first polarizing plate and the second polarizing plate;
the first viewer-side optical layer is disposed between the first polarizing plate and the bend-aligned liquid crystal layer;
the second viewer-side optical layer is disposed between the first polarizing plate and the first viewer-side optical layer;
the first display device-side optical layer is disposed between the second polarizing plate and the bend-aligned liquid crystal layer;
the second display device-side optical layer is disposed between the second polarizing plate and the first display device-side optical layer;
an angle between a first absorption axis of the first polarizing plate and a bend alignment axis of the bend-aligned liquid crystal layer is 45 degrees;
a second absorption axis of the second polarizing plate is perpendicular to the first absorption axis and the angle between the second absorption axis and the liquid crystal alignment axis is 45 degrees;
an angle between an optical axis of the first viewer-side optical layer and the first absorption axis is 45 degrees and a retardation of the first viewer-side optical layer is 42 nm;
an angle between the optical axis of the second viewer-side optical layer and the first absorption axis is 0 degrees, and the in-plane retardation of the second viewer-side optical layer is 275 nm;
an angle between an optical axis of the first display device-side optical layer and the first absorption axis is 45 degrees, and a retardation of the first display device-side optical layer is 42 nm; and
an angle between an optical axis of the second display device-side optical layer and the first absorption axis is 45 degrees, an in-plane retardation of the second display device-side optical layer is 30 nm, and a thickness direction retardation of the second display device-side optical layer is 200 nm.

8. Stereoscopic liquid crystal shutter glasses comprising:
a left-eye liquid crystal shutter; and
a right-eye liquid crystal shutter;
each of the left-eye liquid crystal shutter and the right-eye liquid crystal shutter having a response time not more than 5 milliseconds;
each of the left-eye liquid crystal shutter and the right-eye liquid crystal shutter having a contrast ratio not less than 350:1, the contrast ratio being a value at an angle of sight of 30 degrees in left direction and in right direction;
wherein the left-eye liquid crystal shutter and the right-eye liquid crystal shutter include a bend-aligned liquid crystal layer; and
wherein the left-eye liquid crystal shutter further includes:
a first polarizing plate;
a second polarizing plate;
a first viewer-side optical layer;
a first display device-side optical layer; and
a second display device-side optical layer,
the bend-aligned liquid crystal layer is disposed between the first polarizing plate and the second polarizing plate,
the first viewer-side optical layer is disposed between the first polarizing plate and the bend-aligned liquid crystal layer,
the second viewer-side optical layer is disposed between the first polarizing plate and the first viewer-side optical layer,
the first display device-side optical layer is disposed between the second polarizing plate and the bend-aligned liquid crystal layer,
the second display device-side optical layer is disposed between the second polarizing plate and the first display device-side optical layer,
an angle between a first absorption axis of the first polarizing plate and a liquid crystal alignment axis of the bend-aligned liquid crystal layer is 45 degrees,
a second absorption axis of the second polarizing plate is perpendicular to the first absorption axis and the angle between the second absorption axis and the liquid crystal alignment axis is 45 degrees,
an angle between an optical axis of the first viewer-side optical layer and the first absorption axis is 45 degrees, and a retardation of the first viewer-side optical layer is 42 nm,
an angle between an optical axis of the first display device-side optical layer and the first absorption axis is 45 degrees, and a retardation of the first display device-side optical layer is 42 nm, and
an angle between an optical axis of the second display device-side optical layer and the first absorption axis is 45 degrees, an in-plane retardation of the second display device-side optical layer is 30 nm, and a thickness direction retardation of the second display device-side optical layer is 200 nm.

9. Stereoscopic liquid crystal shutter glasses comprising:
a left-eye liquid crystal shutter; and
a right-eye liquid crystal shutter;
each of the left-eye liquid crystal shutter and the right-eye liquid crystal shutter having a response time not more than 5 milliseconds;
each of the left-eye liquid crystal shutter and the right-eye liquid crystal shutter having a contrast ratio not less than 350:1, the contrast ratio being a value at an angle of sight of 30 degrees in left direction and in right direction;
wherein the left-eye liquid crystal shutter and the right-eye liquid crystal shutter include a bend-aligned liquid crystal layer; and
wherein the left-eye liquid crystal shutter further includes:
a first polarizing plate;
a second polarizing plate;
a first viewer-side optical layer;
a second viewer-side optical layer;
a third viewer-side optical layer;
a first display device-side optical layer;
a second display device-side optical layer; and
a third display device-side optical layer,
the bend-aligned liquid crystal layer is disposed between the first polarizing plate and the second polarizing plate,
the first viewer-side optical layer is disposed between the first polarizing plate and the bend-aligned liquid crystal layer,
the second viewer-side optical layer is disposed between the first polarizing plate and the first viewer-side optical layer,
the third viewer-side optical layer is disposed between the first polarizing plate and the second viewer-side optical layer,
the first display device-side optical layer is disposed between the second polarizing plate and the bend-aligned liquid crystal layer,
the second display device-side optical layer is disposed between the second polarizing plate and the first display device-side optical layer,
the third display device-side optical layer is disposed between the second polarizing plate and the second display device-side optical layer,
an angle between a first absorption axis of the first polarizing plate and a liquid crystal alignment axis of the bend-aligned liquid crystal layer is 45 degrees,
a second absorption axis of the second polarizing plate is perpendicular to the first absorption axis and the angle between the second absorption axis and the liquid crystal alignment axis is 45 degrees,
an angle between an optical axis of the first viewer-side optical layer and the first absorption axis is 135 degrees, and a retardation of the first viewer-side optical layer is 11 nm,
an angle between an optical axis of the second viewer-side optical layer and the first absorption axis is 45 degrees, and a thickness direction retardation of the second viewer-side optical layer is 266 nm,
an angle between an optical axis of the third viewer-side optical layer and the first absorption axis is 45 degrees, and an in-plane retardation of the third viewer-side optical layer is 137 nm,
an angle between an optical axis of the first display device-side optical layer and the first absorption axis is 135 degrees, and a retardation of the first display device-side optical layer is 11 nm,
an angle between an optical axis of the second display device-side optical layer and the first absorption axis is 45 degrees, and a thickness direction retardation of the second display device-side optical layer is 266 nm,
an angle between an optical axis of the third display device-side optical layer and the first absorption axis is 90 degrees, and an in-plane retardation of the third display device-side optical layer is 137 nm.

* * * * *